United States Patent
Ikeda

(10) Patent No.: US 7,023,587 B2
(45) Date of Patent: Apr. 4, 2006

(54) IMAGE SCANNING APPARATUS, RECORDING MEDIUM WHICH STORES IMAGE SCANNING PROGRAMS, AND DATA STRUCTURE

(75) Inventor: Takahiro Ikeda, Toshima-ku (JP)

(73) Assignee: Nikon Corporation, Tokyo (JP)

( * ) Notice: Subject to any disclaimer, the term of this patent is extended or adjusted under 35 U.S.C. 154(b) by 715 days.

(21) Appl. No.: 09/885,911

(22) Filed: Jun. 22, 2001

(65) Prior Publication Data
US 2003/0189736 A1    Oct. 9, 2003

Related U.S. Application Data

(63) Continuation-in-part of application No. 09/707,956, filed on Nov. 8, 2000.

(30) Foreign Application Priority Data

Nov. 12, 1999  (JP)  ................................ 11-322317
Jun. 30, 2000  (JP)  ............................. 2000-198555

(51) Int. Cl.
*H04N 1/04*  (2006.01)

(52) U.S. Cl. ...................... 358/474; 358/475; 358/509; 358/482; 358/487

(58) Field of Classification Search ................ 358/474, 358/475, 509, 505, 512, 515, 448, 483, 468, 358/506, 517, 482, 487, 513, 497, 496, 494; 382/275; 250/330
See application file for complete search history.

(56) References Cited

U.S. PATENT DOCUMENTS

| | | | |
|---|---|---|---|
| 4,870,495 A * | 9/1989 | Kinoshita et al. ............ 348/264 |
| 5,038,227 A * | 8/1991 | Koshiyouji et al. .......... 358/471 |
| 5,092,673 A * | 3/1992 | Hayashi ....................... 396/264 |
| 5,392,068 A * | 2/1995 | Suzuki et al. ............. 348/227.1 |
| 5,631,723 A * | 5/1997 | Arimoto et al. ............. 399/366 |
| 5,721,627 A * | 2/1998 | Kamiya ....................... 358/496 |
| 5,767,989 A * | 6/1998 | Sakaguchi ................... 358/474 |
| 5,877,886 A * | 3/1999 | Ishii et al. ................... 359/212 |
| 5,953,104 A * | 9/1999 | Matsumoto ................... 355/40 |
| 6,084,692 A * | 7/2000 | Ohtani et al. ................ 358/509 |
| 6,166,376 A * | 12/2000 | Kamioka ..................... 250/235 |
| 6,437,358 B1 * | 8/2002 | Potucek et al. ......... 250/559.45 |
| 6,493,114 B1 * | 12/2002 | Liu ............................. 358/509 |
| 6,660,987 B1 * | 12/2003 | Koshimizu ................ 250/208.1 |
| 6,753,984 B1 * | 6/2004 | Wada .......................... 358/475 |
| 6,788,433 B1 * | 9/2004 | Ichikawa et al. ............. 358/1.9 |
| 6,788,436 B1 * | 9/2004 | Yoshida et al. ............. 358/475 |

* cited by examiner

*Primary Examiner*—Mark Wallerson
*Assistant Examiner*—Negussie Worku
(74) *Attorney, Agent, or Firm*—Oliff & Berridge PLC

(57) ABSTRACT

The present invention provides an image scanning apparatus having an illuminating device which irradiates illumination, an imaging element which has a light receiving part for receiving light and for generating signal charges, in which the light is an illumination irradiated from the illuminating device and influenced by the original, and has a transfer part for transferring the signal charges, and a controlling device which indicates timings at a predetermined state used to transfer signal charges generated by the light receiving part of the imaging element. In addition, the present invention provides an image scanning apparatus having an illuminating device, an imaging device which reads out signal charges generated by the light receiving part and outputs the signal charges as image data of the original, and a controlling device that prohibits illumination from irradiating in the illuminating device while image data of the original is output from the imaging device.

12 Claims, 12 Drawing Sheets

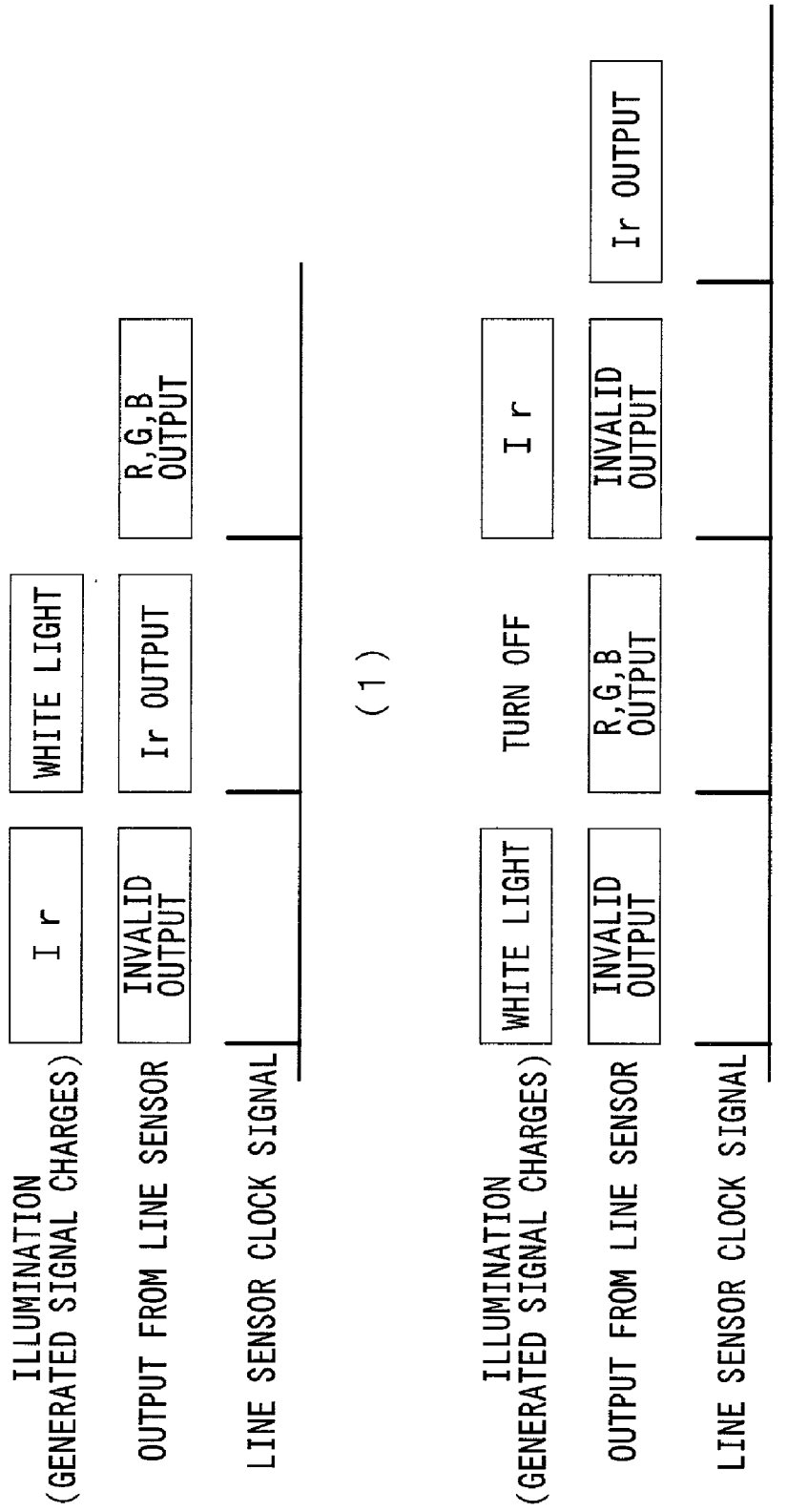
F I G. 4

IMAGE SCANNING APPARATUS, RECORDING MEDIUM WHICH STORES IMAGE SCANNING PROGRAMS, AND DATA STRUCTURE

BACKGROUND OF THE INVENTION

1. Field of the Invention

The present invention relates to an image scanning apparatus which scans images on an original (something to be subjected to scanning, having images or letters printed on) using an image sensor. In addition, the present invention relates to an image scanning apparatus which optically scans images on an original, a recording medium which stores image scanning programs which causes a computer to execute control over the image scanning apparatus, and a data structure for coding and transmitting the image scanning programs.

2. Description of the Related Art

Some image scanning apparatuses sense light reflected from or transmitted through an original using a line sensor or area sensor and generate image data. The line sensor is an image sensor having a one-dimensional arrangement of pixels, while the area sensor is an image sensor having a two-dimensional arrangement of pixels.

In such an image scanning apparatus, a color image is scanned by switching illumination directed upon an original between light of three colors, i.e., red light (R), green light (G), and blue light (B), or by using an image sensor including a color filter.

For example, in an image scanning apparatus including a line sensor as an image sensor, a color image is scanned on a line basis as shown in FIGS. 8(a) and 8(b).

Note however that FIG. 8(a) shows the timings to read image data on a line basis in a line sequence method using a monochrome line sensor. In the line sequence method, the illumination is switched among light of three colors, red light (R), green light (G), and blue light (B) on a line basis. Meanwhile, FIG. 8(b) shows the timings to read image data on a line basis using a color line sensor.

Note that, in FIGS. 8(a) and 8(b) and later-described FIGS. 9(a) and 9(b), in each of the line sensors, photoelectric conversion is performed at the light receiving part of each pixel, and signal charges corresponding to light reflected from or transmitted through an original are generated. The generated signal charges are transferred to a transferring unit in response to a predetermined line sensor clock signal, and output as image data. Signal charges generated at the light receiving part of each pixel during the transition between lines to be scanned, (i.e., signal charges generated at the light receiving part of each pixel while the original or line sensor is moved) are output as invalid data not corresponding to the image data before the image data for the next line is output. Hereinafter, such an output is referred to as invalid output.

Now, FIGS. 8(a) and 8(b) will be described.

In FIG. 8(a), during the invalid output period, signal charges corresponding to the red light (R) are generated. While the signal charges corresponding to the red light (R) are being output as image data (in other words during the R output period), signal charges corresponding to the green light (G) are generated. While the signal charges corresponding to the green light (G) are being output as image data (in other words during the G output period), signal charges corresponding to the blue light (B) are generated. The signal charges corresponding to the blue light (B) are output as image data (which corresponds to the B output) before signal charges for the next line corresponding to the red light (R) are generated.

Meanwhile, in FIG. 8(b), during the invalid output period, signal charges for white light are generated. Note that the signal charges generated at the time are signal charges corresponding to the red light (R), the green light (G) and the blue light (B) filtered through the color filter. These signal charges are output as image data (which corresponds to the R, G and B outputs) before signal charges for the next line are generated.

In an image scanning apparatus which scans images on a film original (hereinafter referred to as the "film scanner"), it is known that defects such as dust, dirt, marks and fingerprints present on the film original appear as spots on the scanned images. These spots could degrade the picture quality. The spot appears as a black spot in a positive film, while it appears as a white spot in a negative film. Herein, the film original is for example a negative film, a reversal film or an elongated film.

In recent years, techniques of detecting defects such as dust, dirt, marks and fingerprints on the film original have been developed to restrain from degradation in picture quality. According to the techniques, an infrared image by infrared light (Ir) is scanned in addition to a color image. Such a technique takes advantage of the characteristic that infrared light (Ir) is transmitted through a film original virtually intact except for parts shut out by the defects such as dust, dirt, marks, and fingerprints. Methods of processing images to compensate for the influence of the defects thus detected have been also implemented.

These techniques may be applied to a film scanner having a monochrome line sensor or a color line sensor, so that color and infrared images can be scanned on a line basis at timings as shown in FIGS. 9(a) and 9(b).

More specifically, in FIG. 9(a), similarly to FIG. 8(a), the invalid output, the R output, and the G output are provided, and then during the following B output period, signal charges corresponding to the infrared light (Ir) are generated. The signal charges corresponding to the infrared light (Ir) are output as image data before signal charges for the next line corresponding to the red light (R) are generated. (This output corresponds to the Ir output.)

In FIG. 9(b), similarly to FIG. 8(b), the invalid output is provided, and then during the R, G and B output period, signal charges corresponding to the infrared light (Ir) are generated. The signal charges corresponding to the infrared light (Ir) are output as image data before signal charges for the next line are generated. (This output corresponds to the Ir output.)

Meanwhile, a normal monochrome line sensor or a normal color line sensor is not adapted to infrared radiation, and therefore signal charges by the infrared light (Ir) are generated at other than at the light receiving part (at the transferring unit for example) which should be shut out against illumination.

More specifically, in FIG. 9(a), during the period in which infrared light (Ir) is irradiated and signal charges corresponding to the infrared light (Ir) are generated, image data for the blue light (B) output through the transferring unit could include additional signal charges by the infrared light (Ir). In FIG. 9(b), during the period in which infrared light (Ir) is irradiated and signal charges corresponding to the infrared light (Ir) are generated, the image data of each color output through the transferring unit could also include additional signal charges by the infrared light (Ir).

In a line sensor in general, the brightness is represented by the amplitude difference between a pre-charged portion (reference) and a data portion. More specifically, the image is darker for smaller amplitude difference and brighter for greater amplitude difference. As shown in FIG. 10, when the original amplitude V1 is added signal charges by the infrared light (Ir) and causes the signal fluctuates, the amplitude is changed to V2.

Therefore, in a film scanner in which each line is scanned in the timings as shown in FIGS. 9(a) and 9(b), the generation of image data by the infrared light (Ir) causes the picture quality in a color image to be degraded.

Such degradation in the picture quality could also be encountered in a film scanner to scan images on a film original in a page sequence method using a monochrome line sensor or using an existing area sensor, or an image scanning apparatus to scan images on an original based on light reflected from the original.

Note that in the page sequence method, all the lines within a scanning area are sequentially scanned using illumination of a single color, and the process is repeated using illumination of all the other colors.

A conventional line sensor is composed as shown in FIG. 11.

In FIG. 11 a line sensor 100 is composed of a sensor 101 wherein a plurality of photoelectric sensors are arranged in a row corresponding to a light receiving part, a charge transfer register 102 comprising a CCD formed in correspondence to each photoelectric sensor of the sensor 101, an read out gate (ROG) 103 disposed between the sensor 101 and the charge transfer register 102, and a charge-to-voltage converter 104 disposed on the output end of the charge transfer register 102.

A signal charge that corresponds to the reflection light and the transmission light of the original is generated at each photoelectric sensor of the sensor 101 between the time when the illumination is irradiating and the read out gate 103 reads out the signal charge generated in this manner to the charge transfer register 102 in correspondence to a clock pulse φROG. The charge transfer register 102 sequentially transfers the signal charge read out in this manner to the charge-to-voltage converter 104 and the charge-to-voltage converter 104 converts the signal charge to a voltage and outputs the voltage as image data.

In this type of line sensor 100, the quantity of light irradiated onto the photoelectric sensor can be controlled by means of adjusting the time the illumination lights and a color image can also be scanned by means of switching the illumination between light of three colors, red light (R), green light (G), and blue light (B), or by providing a color filter.

As shown in FIG. 12, a color image is scanned in a conventional image scanning apparatus provided with this line sensor 100.

FIG. 12(a) shows the timings to scan one line of a color image using the line sequence method in like manner to FIG. 8(a) using the line sensor 100 as a monochrome line sensor. FIG. 12(b) shows the timing to scan an entire color image using the line sensor 10 as a color line sensor when a color filter is provided.

When red light (R) is illuminated while scanning a color image as shown in FIG. 12(a), a signal charge is generated that corresponds to the red light (R) at each photoelectric sensor of the sensor 101. The signal charge that corresponds to the red light (R) generated in this manner is read out to the charge transfer register 102 while clock pulse φROG is at a high level. The signal charge is then sequentially transferred to the charge-to-voltage converter 104 by the charge transfer register 102 while clock pulse φROG is at a low level, converted to a voltage by the charge-to-voltage converter 104 and finally output as valid image data (R output).

Furthermore, while this type of R output is being performed, green light (G) is illuminated and a signal charge that corresponds to the green light (G) is generated. Then, in like manner, blue light (B) is illuminated and a signal charge that corresponds to the blue light (B) is generated while G output is being performed.

In addition, while B output is being performed, the output before illumination is turned off and R output is performed is handled as invalid data.

In contrast, when white light is illuminated while scanning a color image as shown in FIG. 12(b), signal charges are generated which correspond to red light (R), green light (G), and blue light (B) filtered through the color filter at each photoelectric sensor of the sensor 101. These types of signal charges are read out to the charge transfer register 102 while clock pulse φROG is at a high level and are sequentially transferred to the charge-to-voltage converter 104 by the charge transfer register 102 while clock pulse φROG is at a low level, converted to voltages by the charge-to-voltage converter 104 and finally output as valid image data (R, G, B outputs).

While these types of R, G, B outputs are being performed, the output before white light is illuminated, the signal charge in the next line is generated and the R, G, B output of the top line is performed is handled as invalid data.

In other words, if clock pulse φROG changes from a high level to a low level while scanning a color image as shown in FIG. 12, the transfer of the signal charge by the charge transfer register 102 and the voltage conversion of the signal charge by the charge-to-voltage converter 104 will begin accompanied by the illumination irradiating and signal charges being generated at each photoelectric sensor of the sensor 101.

The charge-to-voltage converter 104 is provided in the line sensor 100 in order to convert signal charges supplied from the charge transfer register 102 to a voltage. Because of these characteristics, there is only a slight property that generates signal charges in response to light.

Consequently, as shown in FIG. 12, besides the actual function signal charges are generated in the charge-to-voltage converter 104 during the period in which R output, G output or R, G, B outputs (excluding the final line) is performed as well as while the illumination is irradiating. Because, together with signal charges supplied from the charge transfer register 102, signal charges generated in this manner are converted to a voltage, excess voltage is accumulated equivalent to signal charges generated by the charge-to-voltage converter 104 for the voltage equivalent to signal charges supplied from the charge transfer register 102.

In other words, a problem occurred wherein incorrect image data different from the original images is generated due to the effect of the signal charges generated by the charge-to-voltage converter 104 in the line sensor 100 utilized in image scanning apparatuses which scan color images at the timings shown in FIG. 12. The worst case resulted in blooming, smearing or similar phenomenon occurring.

To decrease the occurrence of noise in recent years, line sensors have been put into practical use having charge-to-voltage converters that have a high conversion efficiency when converting signal charges to voltages. In this type of line sensor, however, the above-mentioned phenomenon occurs quite often.

In addition, the above-mentioned problems are not limited to cases when scanning color images but also cases when valid signal charges as image data generated at each photoelectric sensor of the sensor 101 are voltage-converted in parallel with the illumination being turned on. The problems can also occur in image scanning apparatuses having area sensors (for example, occurs when switching the color of the illumination and scanning color images of an original). Even further, the same type of problem occurs when generating signal charges not only at the charge-to-voltage converter 104 but also at the charge transfer register 102 or the read out gate 103.

A method wherein the charge-to-voltage converter 104 is physically shielded such that illumination is not allowed to strike the charge-to-voltage converter 104 has been considered as a means to solve the aforementioned problems. However, since there is a short distance between the charge-to-voltage converter 104 and the photoelectric sensor of the sensor 101, the method to shield the charge-to-voltage converter 104 also causes the photoelectric sensor at the top of the sensor 101 to be shielded as well. Consequently, this method is not advised.

SUMMARY OF THE INVENTION

The first object of the present invention is to provide an image scanning apparatus capable of precisely scanning images by light to be shut out other than at the light receiving part of an image sensor, and images by light having a long wavelength not to be shut out other than at the light receiving part of the image sensor.

The second object of the present invention is to provide an image scanning apparatus capable of detecting a defect on an original.

The third object of the present invention of the signal charges is to provide an image scanning apparatus capable of precisely scanning images of originals even if the image scanning apparatus has an imaging device where signal charges are generated by members other than the light receiving part.

The fourth object of the present invention is to provide an image scanning apparatus capable of precisely scanning images of originals even if the image scanning apparatus has a line sensor where signal charges are generated by a charge-to-voltage converter.

The fifth object of the present invention is to provide a recording medium that stores image scanning programs capable of precisely scanning images of originals even for an image scanning apparatus having an imaging device where signal charges are generated by members other than the light receiving part.

The sixth object of the present invention is to provide a data structure for coding and transmitting the image scanning programs capable of precisely scanning images of originals even for an image scanning apparatus having an imaging device where signal charges are generated by members other than the light receiving part.

The first and second objects are achieved by an image scanning apparatus comprising: an illuminating device for irradiating two kinds of illumination having different wavelengths; an image sensor for outputting the signal charges as image data of the original, including a light receiving part for receiving light, in which the light is a illumination irradiated from the illuminating device and influenced by an original, and including a transferring unit for transferring signal charges generated at the light receiving part; and a controlling device for instructing the illuminating device to irradiate illumination, and directing the image sensor, under a predetermined condition, a timing to transfer signal charges to the transferring unit.

The predetermined condition, for example, is to prohibit light having a long wavelength from being generated by the illuminating device, during the period in which image data of the original is being output through the transferring unit of the image sensor. Another example of a predetermined condition is to permit light having a long wavelength is to be irradiated by the illuminating device during the period in which invalid data is being discharged by the image sensor. Note that the invalid data refers to signal charges not corresponding to image data of the original.

The image scanning apparatus may detect a defect on an original based on the image data of the original output from the image sensor, in which the image data is received by the light having a long wavelength.

In such an image scanning apparatus, images on the original may be precisely scanned without the influence of the light having a long wavelength not to be shut out other than at the light receiving part of the image sensor.

The third object is achieved by an image scanning apparatus comprising a controlling device for instructing the illuminating device to irradiate illumination, directing the imaging device to read out the signal charge generated by the light receiving part, and prohibiting illumination from irradiating in the illuminating device while image data of the original is output from the imaging device.

Because illumination is prohibited while image data of the original is output in this type of image scanning apparatus, even if the image scanning apparatus has an imaging device where signal charges are generated by members other than the light receiving part, no signal charges are generated by these members while image data of the original is output.

Therefore, even if the image scanning apparatus has an imaging device where signal charges are generated by members other than the light receiving part (in particular, the charge-to-voltage converter), it is possible to precisely scan images of originals without the signal charge generated by this member affecting the image data of the original.

The fourth object is achieved by an image scanning apparatus comprising a controlling device for directing the charge readout part that has a line sensor to read out one line of the signal charge generated by the light receiving part and prohibiting illumination from irradiating in the illuminating device while the signal charge is converted to a voltage by the charge-to-voltage converter and then output as image data of the original.

Because illumination is prohibited while image data of the original is output in this type of image scanning apparatus, no signal charges are generated by the charge-to-voltage converter while image data of the original is output even if the image scanning apparatus has a line sensor where signal charges are generated by the charge-to-voltage converter. In particular, signal charges generated by the charge-to-voltage converter while illumination is irradiating can be output as invalid data in an image scanning apparatus having an imaging device that has a function to output at least signal charges generated by the charge-to-voltage converter as invalid data that does not correspond to image data of the original while illumination is irradiating from the illuminating device.

Consequently, even if the image scanning apparatus has a line sensor where signal charges are generated by members other than the light receiving part (in particular, the charge-to-voltage converter), it is possible to precisely scan images of originals without the signal charge generated by this member affecting the image data of the original.

The fifth object is achieved by a recording medium that stores image scanning programs which execute in a computer a control procedure that includes instructing the illuminating device to irradiate illumination, directing the imaging device to read out the signal charge generated by the light receiving part and prohibiting illumination from irradiating in the illuminating device while image data of the original is output from the imaging device.

The sixth object is achieved by a data structure for coding and transmitting image scanning programs which causes a computer to execute control procedure that includes instructing the illuminating device to irradiate illumination, directing the imaging device to read out the signal charge generated by the light receiving part and prohibiting illumination from irradiating in the illuminating device while image data of the original is output from the imaging device.

According to the above-mentioned control procedure, a computer can be used to prohibit illumination from irradiating while image data of the original is output. Because of this, even in an image scanning apparatus where signal charges are generated by members other than the light receiving part, no signal charges are generated by these members while image data of the original is output.

Consequently, even in an image scanning apparatus where signal charges are generated by members other than the light receiving part (in particular, the charge-to-voltage converter), it is possible to precisely scan images of originals without the signal charge generated by this member affecting the image data of the original.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 4(1) and 4(2) are timing charts showing the timings to scan color and infrared images on a line basis according to a third embodiment of the present invention;

DESCRIPTION OF THE PREFERRED EMBODIMENTS

Embodiments of the present invention will be now described in detail with reference to the drawings.

Note that in the following second to fifth embodiments, the present invention is applied to a film scanner as an example of an image scanning apparatus, while the present invention is similarly applicable to image scanning apparatuses other than the film scanner.

[First Embodiment]

A first embodiment of the present invention is an image scanning apparatus.

Figure 1:
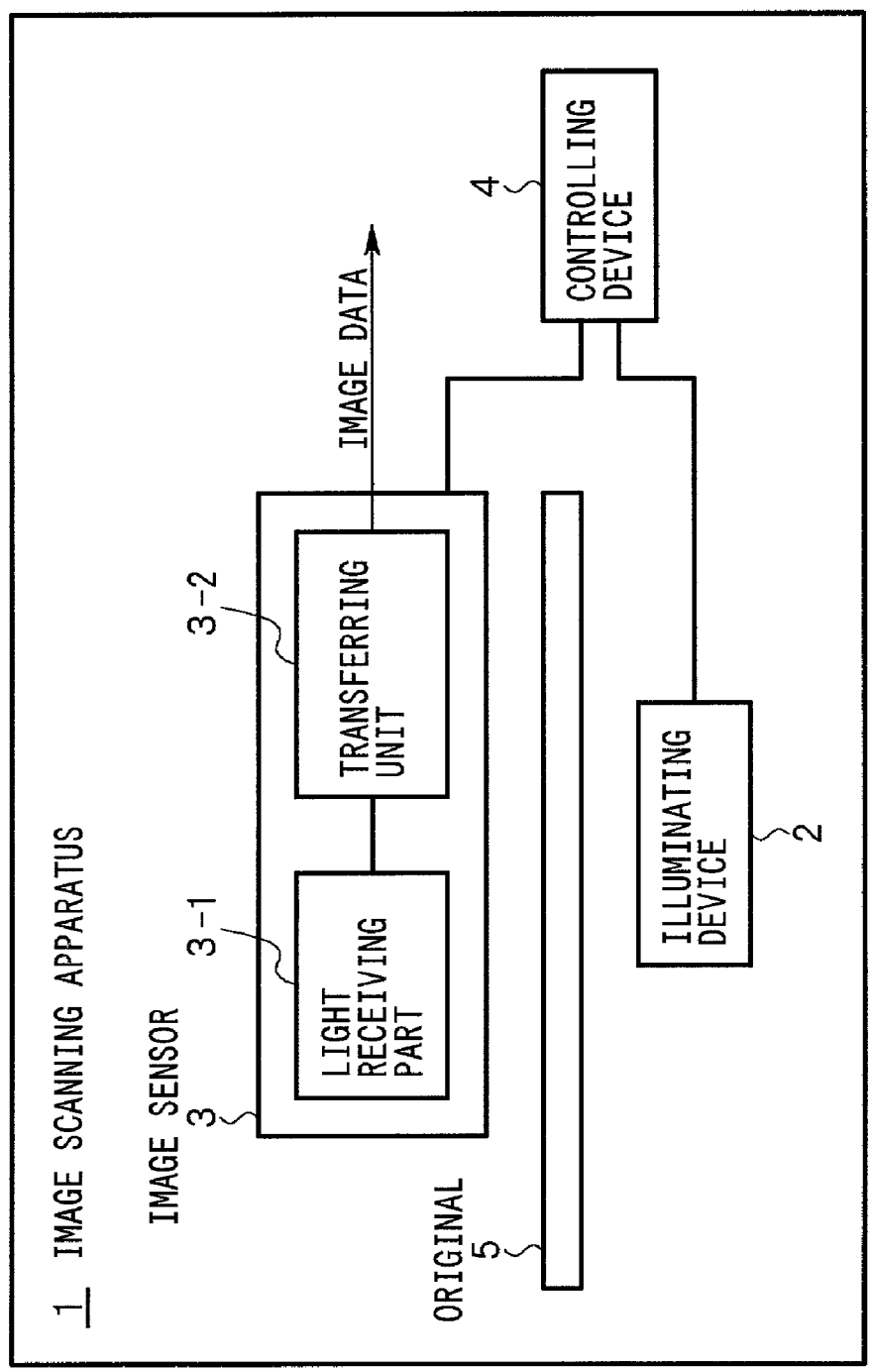
FIG. 1 is a diagram of an image scanning apparatus according to a first embodiment of the present invention.

In FIG. 1, the image scanning apparatus 1 includes an illuminating device 2, an image sensor 3, and a controlling device 4.

The illuminating device 2 irradiates illumination upon an original 5. The illuminating device 2 also respectively irradiates the original 5 with two kinds of light as illumination, i.e., light to be shut out other than at the light receiving part 3-1 of the image sensor 3, and light having a long wavelength not to be shut out other than at the light receiving part 3-1 of the image sensor 3.

The image sensor 3 receives at the light receiving part 3-1 light irradiated as the illumination from the illuminating device 2 and transmitted through or reflected from the original 5 and generates signal charges. The image sensor 3 transfers the signal charges to the transferring unit 3-2 for output as image data of the original.

The controlling device 4 instructs the illuminating device 2 to irradiate the illumination. The controlling device 4 also informs the image sensor the timing to transfer the signal charges to the transferring unit 3-2, in which the signal charges are generated at the light receiving part 3-1 of the image sensor 3. The controlling device 4 also prohibits light having a long wavelength from being irradiated by the illuminating device 2 during the period in which the image data of the original 5 is being output through the transferring unit 3-2 of the image sensor 3.

In such an image scanning apparatus 1, signal charges are generated at the transferring unit 3-2 of the image sensor 3 by light having a long wavelength transmitted through or reflected from the original 5, but the light having a long wavelength is prohibited from being irradiated during the period in which the image data of the original 5 is being output through the transferring unit 3-2 of the image sensor 3. Therefore, the output of the image data will not be affected by the signal charges generated at the transferring unit 3-2 of the image sensor 3.

Here, in the image scanning apparatus 1, preferably, the image sensor 3 discharges signal charges not corresponding to the image data of the original 5 as invalid data and the controlling device 4 permits light with a long wavelength to be irradiated by the illuminating device 2 during the period in which the invalid data is discharged by the image sensor 3.

Thus, the image scanning apparatus 1 can irradiate light with a long wavelength during the period in which the invalid data is discharged, so that signal charges generated at the transferring unit 3-2 of the image sensor 3 by the light with a long wavelength can be discharged together with the invalid data.

The image scanning apparatus 1 discharges the invalid data and generates signal charges by the light with a long wavelength at the same time, so that a separate period to generate these signal charges is not necessary. Therefore, the image scanning apparatus 1 can quickly scan images on the original 5 by the light shut out other than at the light receiving part 3-1 of the image sensor 3 and images on the original 5 by the light with a long wavelength not shut out other than at the light receiving part 3-1 of the image sensor 3.

Furthermore, in the image scanning apparatus 1, the light with a long wavelength irradiated upon the original 5 by the illuminating device 2 is light which is received with low photosensitivity by normal images on the original, and is shut out by defects on the original 5. The controlling portion 4 preferably detects defects on the original 5 based on the image data from the original 5 output from the image sensor 3, in which the image data is obtained by the light with a long wavelength.

For example, if such an image scanning apparatus 1 is intended to scan visible color images, infrared light having a wavelength of 700 nm or more could be used as light which is received with low photosensitivity by normal images on the original 5, and shut out by defects on the original 5 (light with a long wavelength).

Another embodiment will be now described.

[Second Embodiment]

A second embodiment of the present invention is a film scanner.

Figure 2:
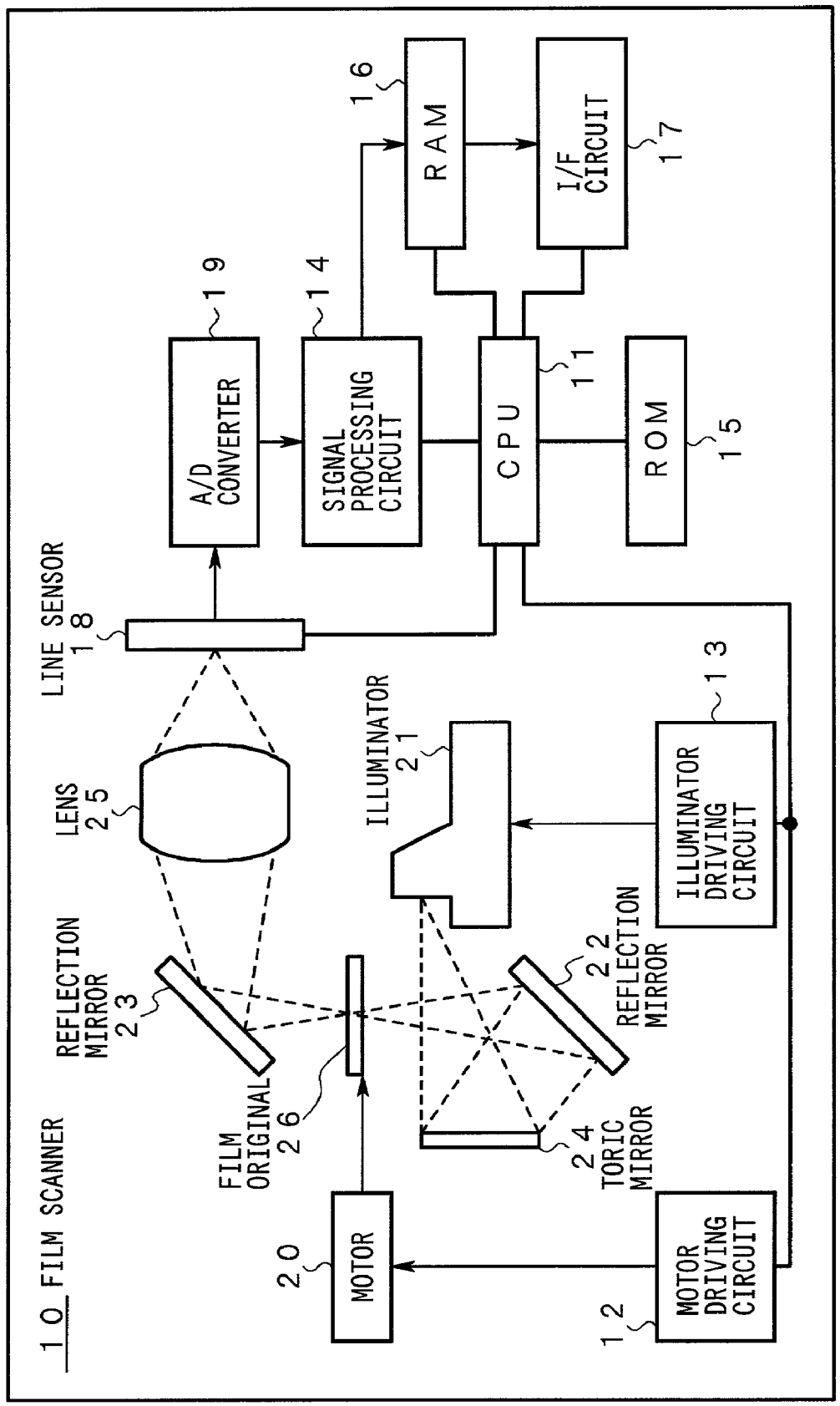
FIG. 2 is a diagram of the configuration of a film scanner.

In FIG. 2, the film scanner 10 includes a CPU 11, a motor driving circuit 12 connected to the CPU 11 through a bus, an illuminator driving circuit 13, a signal processing circuit 14, a ROM 15, a RAM 16, an interface circuit (I/F circuit) 17, a line sensor 18, an A/D converter 19, a motor 20, an illuminator 21, an optical system (reflection mirrors 22, 23, a toric mirror 24, a lens 25 and the like), and a conveying path for a film original 26 (not shown).

Note that in the second embodiment, though different depending upon the kinds of the illuminator 21 and the line sensor 18, the method of reading image data on the film original 26 is to read a film original in a line sequence method using a monochrome line sensor with the illumination sequentially switched.

The operation of each portion of the film scanner 10 will be now described.

The illuminator 21 sequentially switches between the kinds of illumination to be on and off under the control of the illuminator driving circuit 13 operating in response to an instruction from the CPU 11. (All the light is turned off in some cases). Note that the illuminator 21 sequentially switches between light of three colors, red light (R), green light (G), and blue light (B) and infrared light (Ir) to be on and off in the second embodiment.

The optical system (reflection mirrors 22, 23, the toric mirror 24, the lens 25 and the like) guides illumination irradiated from the illuminator 21 into a region having a width of one line on the film original 26, and guides light transmitted through the film original 26 into the line sensor 18 for image formation.

The motor 20 drives a roller pair present in the conveying path for the film original 26 under the control of the motor driving circuit 12 operating in response to an instruction from the CPU 11, so that the film original 26 is moved in the sub-scan direction on a line basis.

The line sensor 18 performs photoelectric conversion at the light receiving parts of a plurality of pixels arranged in one line and generates signal charges corresponding to the transmitted light guided by the optical system. The line sensor 18 transfers the signal charges to a transferring unit inside in response to a line sensor clock signal supplied from the CPU 11 in order to output the signal charges as image data.

The A/D conversion portion 19 A/D-converts the image data thus output from the line sensor 18 for supplying to the signal processing circuit 14.

The signal processing circuit 14 subjects the supplied image data to a predetermined signal processing (such as various compensation processing) and stores the resulting data in the RAM 16. The image data stored in the RAM 16 is externally output through the I/F circuit 17.

The CPU 11 controls the operations of the motor driving circuit 12, the illuminator driving circuit 13, the line sensor 18 and the like in the above described manner. The CPU 11 detects defects such as dust, dirt, marks and fingerprints on the film original 26 using the image data by infrared light (Ir) stored in the RAM 16. Note that the defects may be detected by a conventional method, and therefore the method is not detailed here.

In the second embodiment, the order of the illumination to be switched on and off by the illuminator 21 or the timing to transfer the signal charges generated at the light receiving part of the line sensor 18 is controlled by the CPU 11. The timings to scan color and infrared images on the film original 26 on a line basis are determined also under the control of the CPU 11. The CPU 11 controls "the order of the illumination to be switched on and off by the illuminator 21" or "the timings to transfer the signal charges generated at the light receiving part of the line sensor 18 to the transferring unit" in response to output of a line sensor clock signal.

Figure 3:
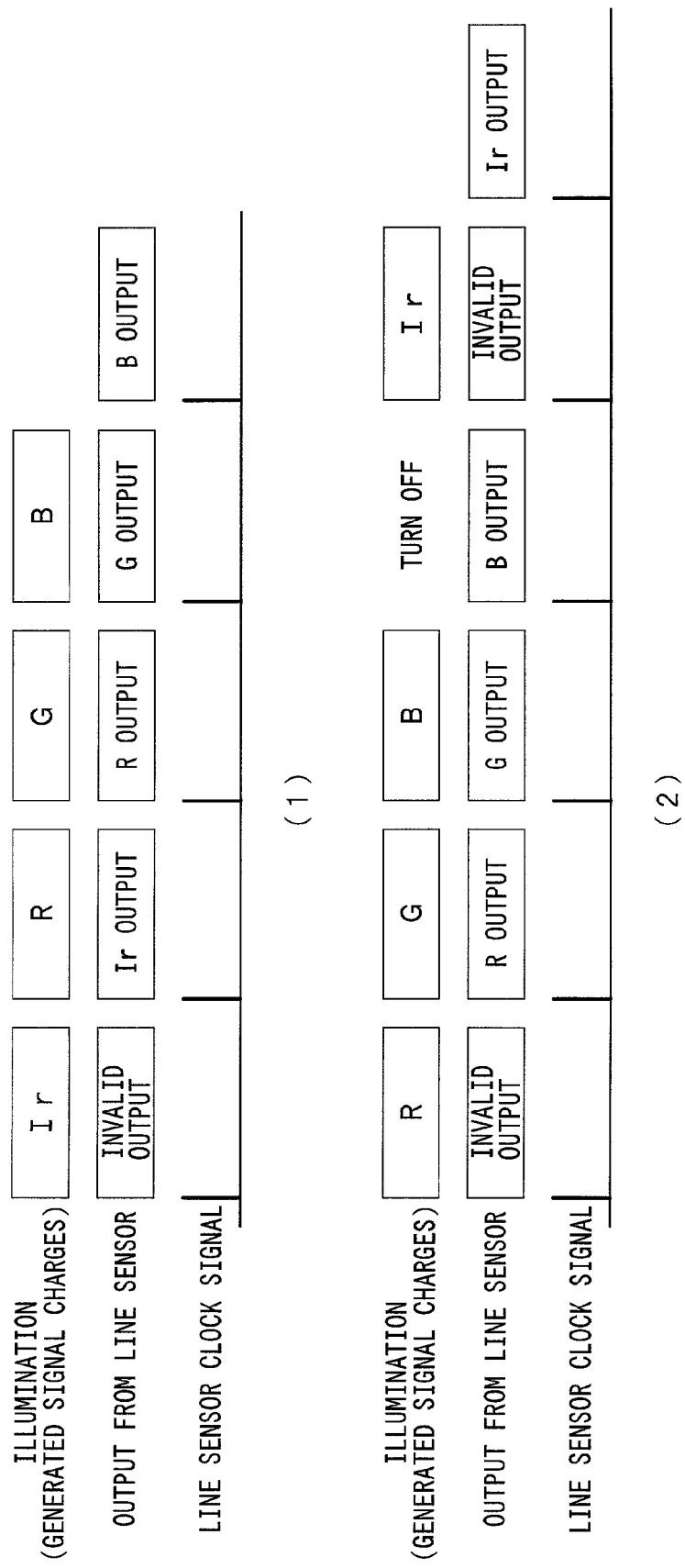
FIGS. 3(1) and 3(2) are timing charts showing the timings to scan color and infrared images on a line basis according to a second embodiment of the present invention.

Referring to FIGS. 3(1) and 3(2), the timings to scan color and infrared images on a line basis according to the second embodiment will be now described.

In FIG. 3(1), during the invalid output period (i.e., during the period in which invalid data not corresponding to image data is output), signal charges corresponding to infrared light (Ir) are generated. During the period in which the signal charges corresponding to the infrared light (Ir) are output as image data (i.e., the Ir output period), signal charges corresponding to the red light (R) are generated. During the R output period, signal charges corresponding to the green light (G) are generated, and during the G output period, signal charges corresponding to blue light (B) are generated. Furthermore, the B output is provided before signal charges for the next line corresponding to the infrared light (Ir) are generated.

More specifically, when color and infrared images are scanned on a line basis in the timings as shown in FIG. 3(1), signal charges generated at the transferring unit during the period in which the infrared light (Ir) is irradiated are discharged together with the invalid data generated while the film original 26 is moved one line by the motor 20.

Figure 9:
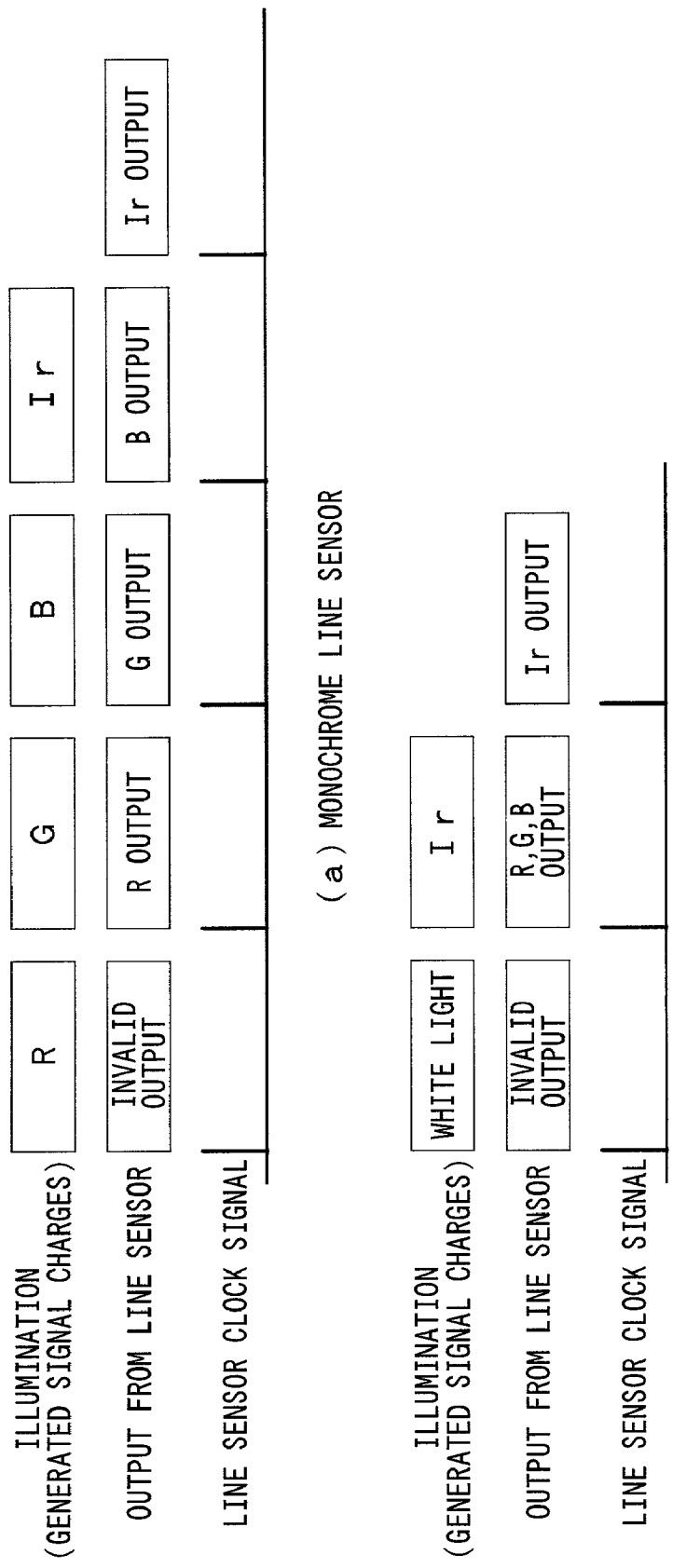
FIGS. 9(a) and 9(b) are timing charts showing the timings to scan color and infrared images on a line basis in a conventional film scanner.
Figure 10:
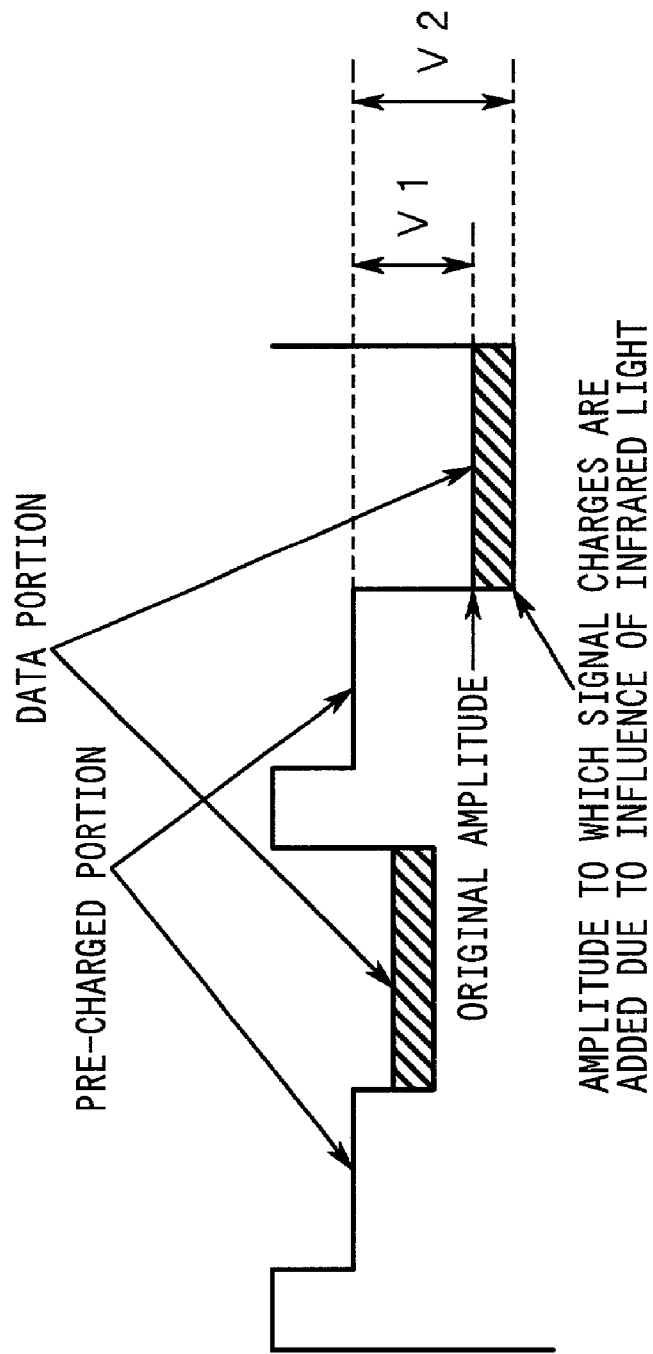
FIG. 10 is a waveform chart showing the influence of infrared light in a conventional film scanner.

Meanwhile, in FIG. 3(2), similarly to FIG. 9(a), during the invalid output period, signal charges corresponding to the infrared light (R) are generated. During the R output period, signal charges corresponding to the green light (G) are generated, and during the G output period, signal charges corresponding to the blue light (B) are generated. Note however in FIG. 3(2), unlike FIG. 9(a), during the B output, the illuminator 21 is turned off. Note that the illuminator 21 is turned off by the illuminator driving circuit 13 in response to an instruction from the CPU 11. Also in FIG. 3(2), during the period in which signal charges generated at the light receiving part of each pixel in the line sensor 18 are discharged as invalid data (i.e. during the invalid output period) with the illuminator 21 being tuned off, signal charges corresponding to infrared light (Ir) are generated. The signal charges thus generated (i.e., the Ir output) are output before signal charges for the next line are generated.

More specifically, when color and infrared images are scanned on a line basis in the timings as shown in FIG. 3(2), signal charges generated at the transferring unit during the irradiation of the infrared light (Ir) are discharged together with invalid data during the period in which the illuminator 21 is forcibly turned off.

As in the forgoing, in the second embodiment, color and infrared images are scanned on a line basis in the timings as shown in FIGS. 3(1) and 3(2), and therefore the influence of the infrared light (Ir) upon scanning of the color image can be avoided. The signal charges corresponding to the infrared light (Ir) generated at the transferring unit will not affect scanning of the infrared image.

Note that in the second embodiment, image data on the film original 26 is read in the line sequence method using a monochrome line sensor, while the present invention is also applicable to a film scanner which reads image data on the film original 26 in a page sequence method using a monochrome line sensor.

Assume for example that such a film scanner is used that an infrared image within a scanning area is scanned in the page sequence method using a monochrome line sensor, and then a color image within the same scanning area is scanned. In this film scanner, in scanning the infrared image, signal charges for the first line corresponding to infrared light (Ir) are generated during the invalid output period, and then signal charges corresponding to the infrared light (Ir) are read sequentially on a line basis. While the Ir output for a previous line is provided, signal charges for the next line corresponding to the infrared light (Ir) are prohibited from being generated. Thus, the influence of the infrared light (Ir) for the next line upon the Ir output for the previous line can be avoided.

Meanwhile, assume for example that such a film scanner is used that a color image within a scanning area is scanned in the page sequence method using a monochrome line sensor in the order of red light (R), green light (G), and blue light (B), and then an infrared image within the same scanning area is scanned. In this film scanner, in scanning the color image, the illuminator 21 is turned off while the B output for the final line is provided. In the following scanning of the infrared image, signal charges for the first line corresponding to the infrared light (Ir) start to be generated after the B output for the final line is provided. More specifically, while the B output for the final line is being provided, signal charges corresponding to the infrared light (Ir) is prohibited from being generated. Therefore, the influence of the infrared light (Ir) upon scanning of the color image can be avoided.

Another embodiment of the present invention will be now described.

[Third Embodiment]

A third embodiment of the present invention is a film scanner.

The structure of the film scanner according to the third embodiment is the same as that of the film scanner according to the second embodiment shown in FIG. 2 except for the following points and therefore the structure is not detailed here. More specifically, in the second embodiment, the line sequence method using a monochrome line sensor is employed as described above, while in the third embodiment, image data is read using a color line sensor having a color filter. In the second embodiment, the illuminator 21 emits light of three colors and infrared light (Ir), while in the third embodiment, the illuminator 21 sequentially switches between white light and infrared light (Ir) to be on and off.

Referring to FIGS. 4(1) and 4(2), the timings to scan color and infrared images on a line basis according to the third embodiment will be described.

In FIG. 4(1), during the invalid output period, signal charges corresponding to infrared light (Ir) are generated and during the Ir output period, signal charges corresponding to white light are generated. More specifically, during the Ir output period, signal charges corresponding to red light (R), green light (G) and blue light (B) filtered through the color filter are generated. The R, G and B outputs are provided before signal charges for the next line corresponding to the infrared light (Ir) are generated.

More specifically, when color and infrared images are scanned on a line basis in the timings as shown in FIG. 4(1), the signal charges generated at the transferring unit during the irradiation of the infrared light (Ir) are discharged together with invalid data generated while the film original 26 is moved for one line by the motor 20.

Meanwhile, in FIG. 4(2), during the invalid output period, similarly to FIG. 9(b), signal charges corresponding to white light are generated. More specifically, signal charges corresponding to red light (R), green light (G), and blue light (B) filtered through the color filter are generated. However, during the R, G and B output period, the illuminator 21 is turned off. Note that the illuminator 21 is thus turned off by the illuminator driving circuit 13 in response to an instruction from the CPU 11. In FIG. 4(2), signal charges corresponding to the infrared light (Ir) are generated during the period in which signal charges generated at the light receiving part of each pixel in the line sensor 18 as the illuminator 21 is off are discharged as invalid data (i.e., during the invalid output period). The Ir output is provided before signal charges for the next line are generated.

More specifically, when color and infrared images are scanned on a line basis in the timings as shown in FIG. 4(2), signal charges generated at the transferring unit during the irradiation of infrared light (Ir) are discharged together with invalid data generated during the period in which the illuminator 21 is forcibly turned off.

As in the foregoing, in the third embodiment, color and infrared images are scanned on a line basis in the timings as shown in FIGS. 4(1) and 4(2), so that the influence of the infrared light (Ir) upon scanning of the color image can be avoided. In addition, the signal charges corresponding to the infrared light (Ir) generated at the transferring unit will not affect scanning of the infrared image.

Note that in the third embodiment, the white light and infrared light (Ir) are switched on a line basis and the color and infrared images are repeatedly scanned on a line basis. Meanwhile, the present invention is applicable to a film scanner which scans an infrared image within a scanning area before or after a color image in the same scanning area.

For example, in a film scanner which scans an infrared image in a scanning area and then a color image in the same scanning area, at the time of scanning the infrared image, signal charges for the first line corresponding to the infrared light (Ir) are generated during the invalid output period. Signal charges thereafter corresponding to the infrared light are generated sequentially on a line basis, but during the Ir output period for a previous line, signal charges for the next line corresponding to the infrared light (Ir) are prohibited from being generated. As a result, the influence of the infrared light (Ir) for the next line upon the Ir output for the previous line can be avoided.

In a film scanner which scans a color image in a scanning area and then an infrared image in the same scanning area, at the time of scanning the color image, the illuminator 21 is turned off during the R, G and B output period for the final line, and in the following scanning of the infrared image, signal charges for the first line corresponding to the infrared light (Ir) start to be generated after the R, G and B output period for the final line is over. More specifically, during the R, G and B output period for the final line, signal charges corresponding to the infrared light (Ir) are prohibited from being generated. Therefore, the influence of the infrared light (Ir) upon scanning of the color image can be avoided.

In the above-described first to third embodiments, signal charges corresponding to the infrared light (Ir) are generated during the invalid output period. In FIG. 3(2) or FIG. 4(2), a period to forcibly turn off the illuminator 21 should be separately provided in order to thus provide the invalid output. In contrast, in FIG. 3(1) or FIG. 4(1), such a separate period is not necessary. Therefore, in FIG. 3(1), color and infrared images can be quickly scanned on a line basis as compared to FIG. 3(2). In FIG. 4(1), color and infrared images can be quickly scanned as compared to FIG. 4(2).

In the above described first to third embodiments, invalid data generated during the transition between lines to be scanned (i.e., while the film original 26 is moved for one line) is output with the invalid output for the next line. Meanwhile, in a film scanner in which such transition may be instantaneously achieved, the invalid output is sometimes not provided for the next line. In this case, in the film scanner, similarly to FIG. 3(2) and FIG. 4(2), a period to forcibly turn off the illuminator 21 is separately provided, so that the infrared image can be scanned while the influence of infrared light (Ir) upon scanning of the color image can be avoided.

Furthermore, in the above described first to third embodiments, signal charges corresponding to the infrared light (Ir) are generated once on a line basis, while the present invention is applicable to such a case in which signal charges corresponding to the infrared light (Ir) are generated a number of times on a line basis. In this case, according to the present invention, before signal charges corresponding to the infrared light (Ir) are generated, a period to turn off the illuminator 21 is provided. While signal charges generated during the period are discharged as invalid data, signal charges corresponding to the infrared light (Ir) are generated, so that the influence of the infrared light (Ir) upon scanning of the color image, or the influence of the infrared light (Ir) upon one another between infrared images to be scanned.

In the above described first to third embodiments, the scanned infrared image is used for detecting defects such as dust, dirt, marks or fingerprints on the film original 26, but the image may be externally output through the I/F circuit 17.

Next, another embodiment will be now described.

[Fourth Embodiment]

A fourth embodiment of the present invention is a film scanner.

Figure 5:
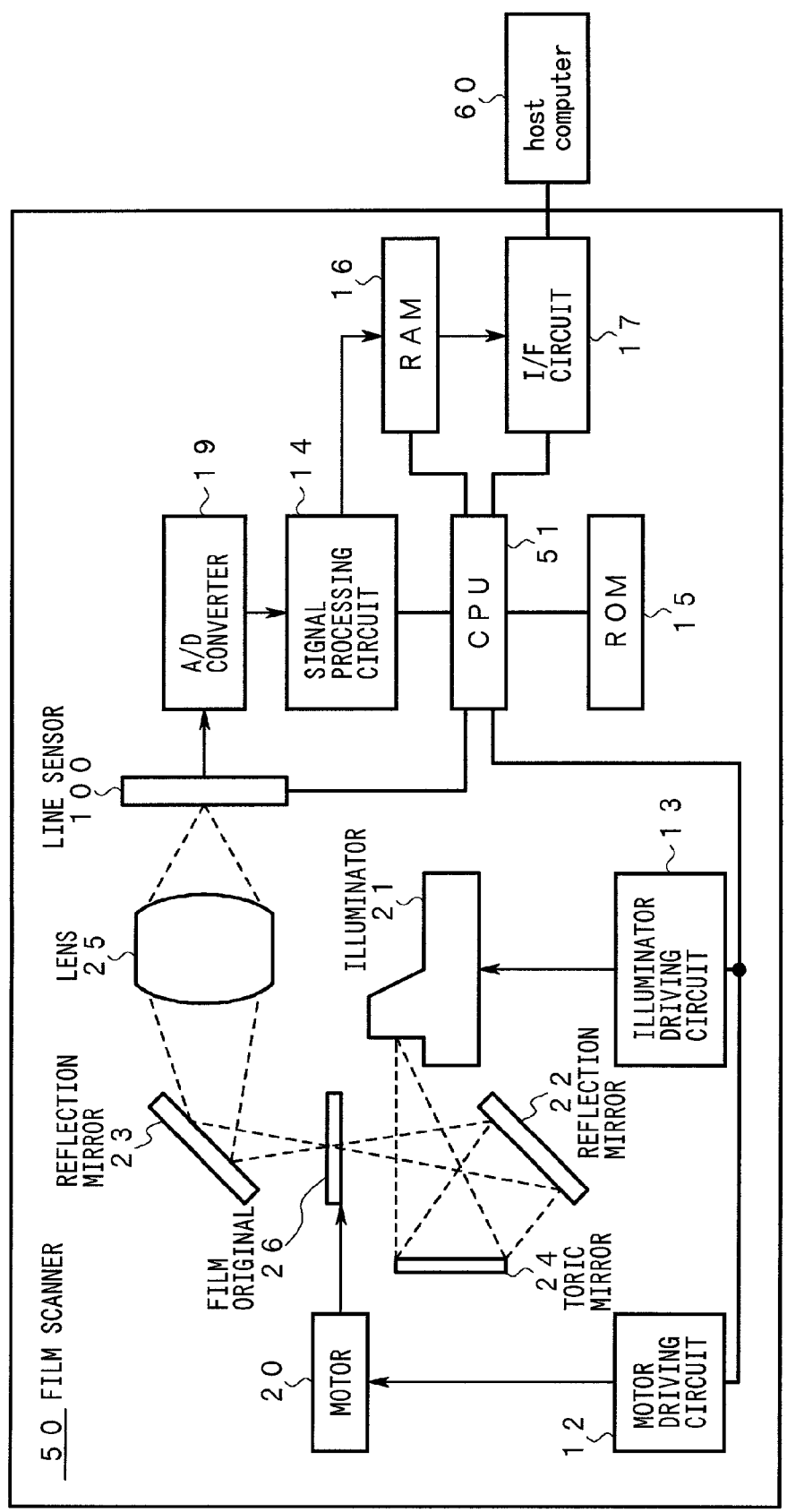
FIG. 5 is a diagram of the configuration of a film scanner.
Figure 11:
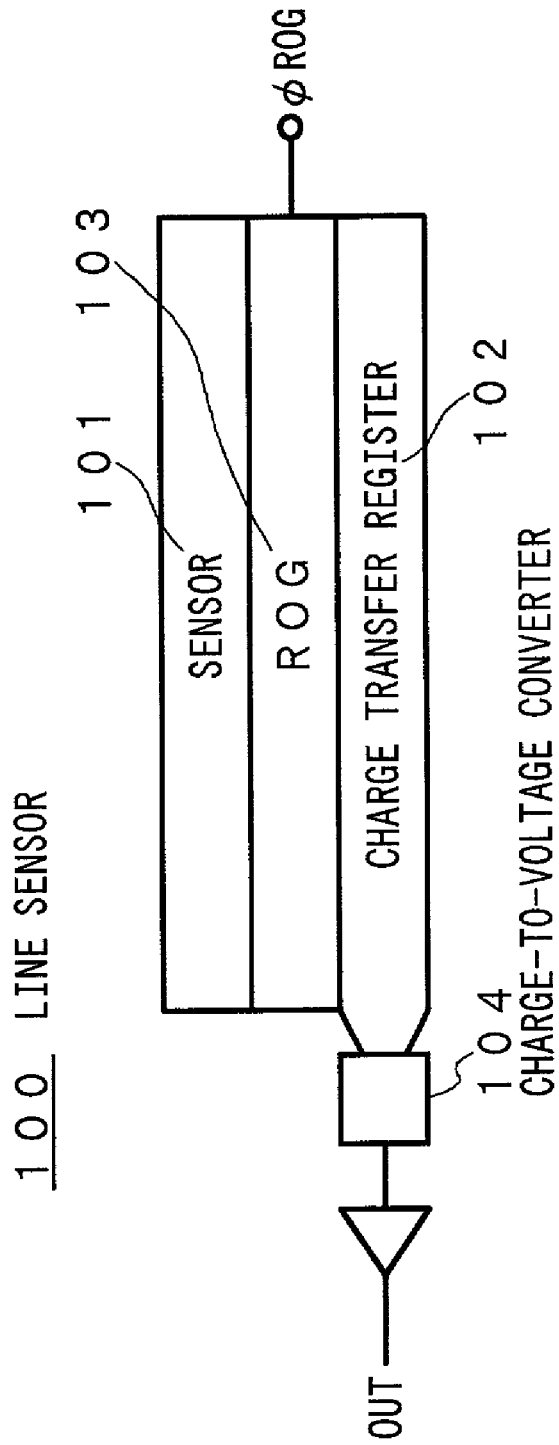
FIG. 11 is a diagram of the configuration of a generic line sensor.

In FIG. 5 the film scanner 50 includes the line sensor 100 shown in FIG. 11 and a motor driving circuit 12 connected to the CPU 51 through a bus, an illuminator driving circuit 13, a signal processing circuit 14, a ROM 15, a RAM 16, an interface circuit (I/F circuit) 17, an A/D converter 19, a motor 20, an illuminator 21, an optical system (reflection mirrors 22, 23, a toric mirror 24, a lens 25 and the like), and a conveying path for a film original 26 (not shown). The film scanner 50 is connected to a host computer (equivalent to a personal computer) 60 through the I/F circuit 17.

In FIG. 5 elements that have the functions and structure that are the same as the film scanner 10 shown in FIG. 2 will be designated by identical reference numbers. Therefore the description thereof will be omitted here.

In the film scanner 50, the image data stored in the RAM 16 is output to the host computer 60 through the I/F circuit 17. The period of φROG and the timing to start the illumination of the illuminator 21 are controlled by the CPU 51. The timings to scan the color image of the film original 26 are also controlled by the CPU 51.

In the following referring to FIG. 6, timings to scan a color image in the fourth embodiment will now be described. In the fourth embodiment however, the illumination is sequentially switched and image data of the film original 26 is scanned by the line sequence method using a monochrome line sensor. In the following, timings to scan a portion equal to one line of a color image will be described.

Figure 6:
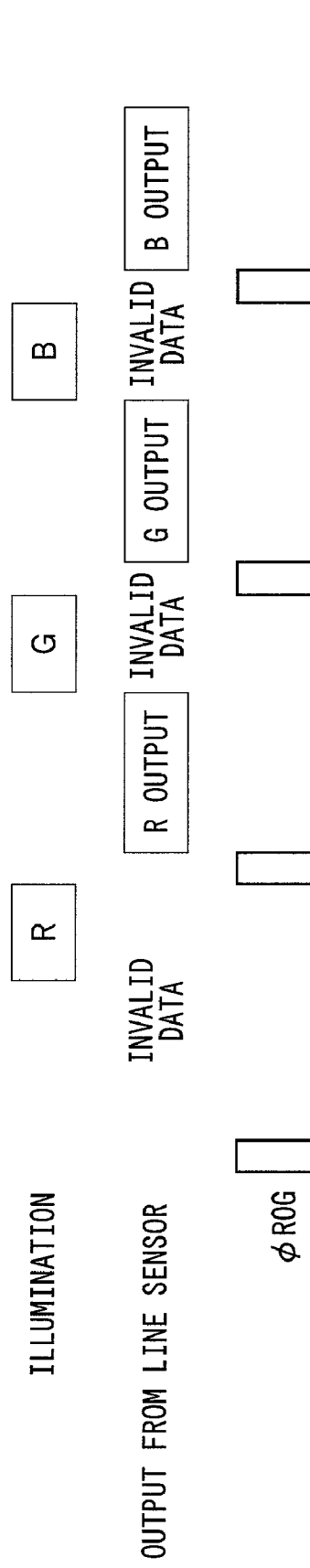
FIG. 6 is a timing chart showing timings to scan a color image according to a fourth embodiment of the present invention.

At first, in FIG. 6 φROG changes from a high level to a low level and a red light (R) is illuminated when a fixed time passes. The red light (R) is turned off up until φROG changes to a high level and when φROG changes to a high level, a signal charge corresponding to the red light (R) is read out. Then, when φROG changes to a low level again, R output is initiated.

When the R output completes, a green light (G) is illuminated and is turned off up until φROG changes to a high level. Then, when φROG changes to a high level, a signal charge corresponding to the green light (G) is read out and when φROG changes to a low level again, G output is initiated.

Further, when the G output completes, a blue light (B) is illuminated and is turned off up until φROG changes to a high level. Then, when φROG changes to a high level, a signal charge corresponding to the blue light (B) is read out and when φROG changes to a low level again, B output is initiated.

In other words, the operation of scanning a color image using the timings shown in FIG. 6 is different from the timings shown in FIG. 12(a). The R output is not performed while the green light (G) is illuminated and the G output is not performed while the blue light (B) is illuminated. In addition, the output while the green light (G) or blue light (B) is illuminated can be handled as invalid data.

Therefore, in the fourth embodiment, even if a signal charge is generated by the charge-to-voltage converter 104 inside the line sensor 100, the film original 26 can be scanned without being influenced by this signal charge.

Even further, in the fourth embodiment, the film original 26 is scanned by the line sequence method using a monochrome line sensor although the present invention can also be applied when scanning the film original 26 by a page sequence method using a monochrome line sensor.

For example, when repeatedly illuminating the red light (R) on and off and scanning all the lines within a scanning range, the red light (R) will illuminate after the R output of each line completes. As far as the green light (G) or the blue light (B) is concerned, the film original 26 can be scanned without being influenced by the signal charge generated by the charge-to-voltage converter 104 when the green light (G) or the blue light (B) illuminate after the G output or B output of each line completes.

Moreover, in the fourth embodiment, as shown in FIG. 6, color images are scanned in the film scanner 10 having a monochrome line sensor, although, as shown in FIG. 6 as well, scanning that includes turning off the illumination while the R output or G output is being performed can also be applied in an image scanning apparatus that switches the color of the illumination light and scans color images of originals using an area sensor.

Next, another embodiment will be now described.

[Fifth Embodiment]

A fifth embodiment of the present invention is a film scanner.

The structure of the film scanner according to the fifth embodiment is the same as that of the film scanner 50 according to the fourth embodiment shown in FIG. 5 except for the following points, and therefore the structure will not be detailed here. More specifically, in the fourth embodiment, the line sequence method using a monochrome line sensor is employed as described above, while in the fifth embodiment, image data is read using a color line sensor having a color filter. In the fourth embodiment, the illuminator 21 illuminates light of three colors on and off while in the fifth embodiment, the illuminator 21 illuminates white light on and off.

In the following, referring to FIG. 7, the timing to scan color images according to the fifth embodiment will be now described. In the fifth embodiment image data is read using a color line sensor having a color filter. The description below describes timings to scan all the lines within a scanning range of a color image.

Figure 7:
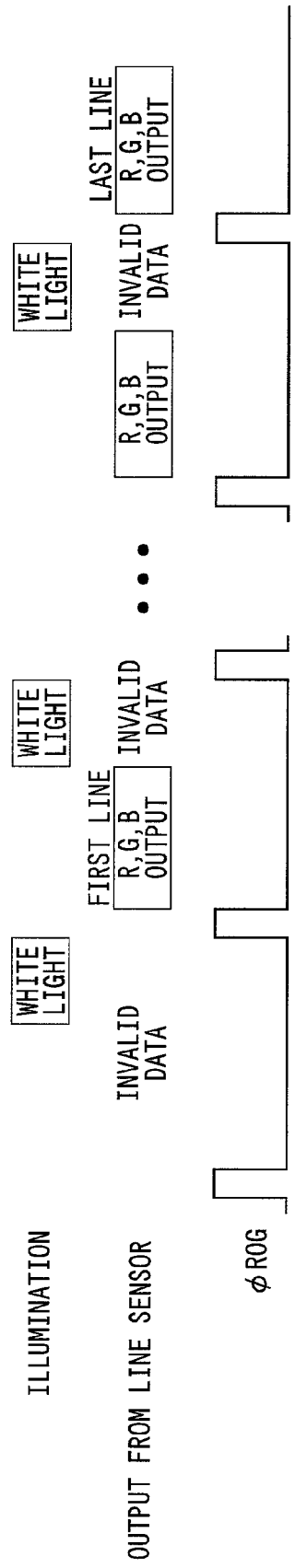
FIG. 7 is a timing chart showing timings to scan a color image according to a fifth embodiment of the present invention.
Figure 8:
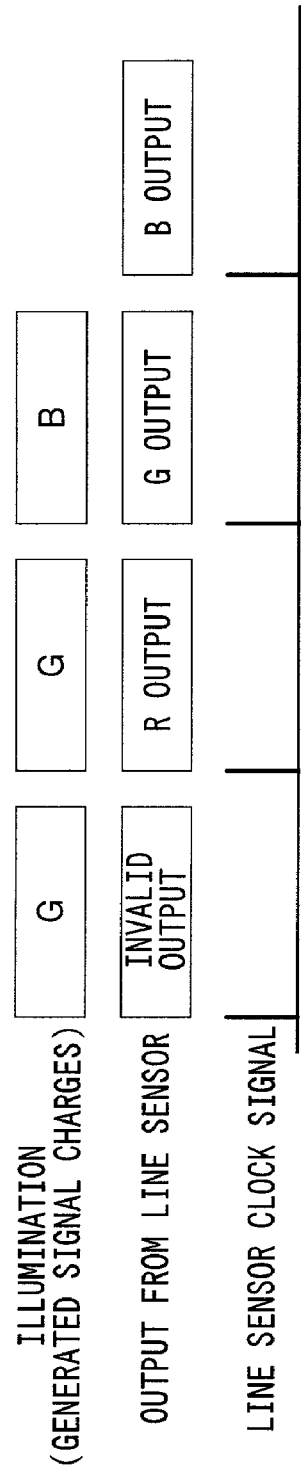
FIGS. 8(a) and 8(b) are timing charts showing the timings to scan a color image on a line basis in a conventional image scanning apparatus.
Figure 8:
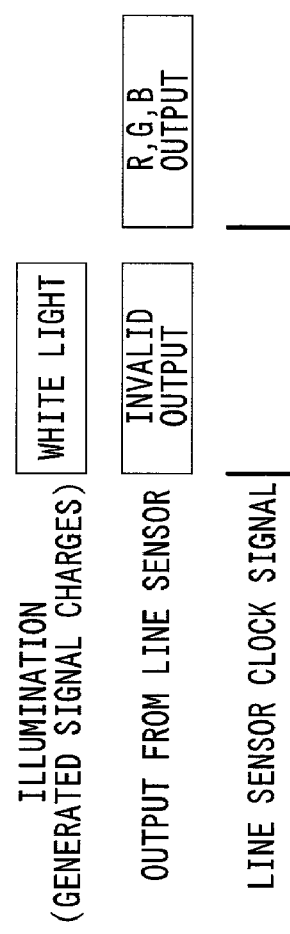

At first, in FIG. 7 φROG changes from a high level to a low level and a white light is illuminated when a fixed time passes. The white light is turned off up until φROG changes to a high level and when φROG changes to a high level, a signal charge (signal charge corresponding to red light (R), green light (G) and blue light (B) filtered through a color filter) corresponding to the white light is read out. Then, when φROG changes to a low level again, R, G, B outputs are initiated.

The white light is illuminated again when the R, G, B outputs complete and is turned off up until φROG changes to a high level.

Figure 12:
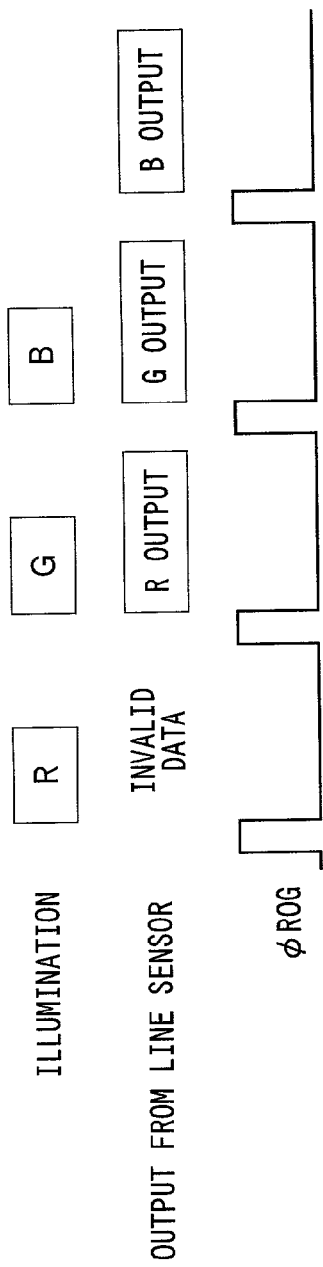
FIG. 12 shows an example of timings to scan a color image using a conventional image scanning apparatus having the line sensor 100.
Figure 12:
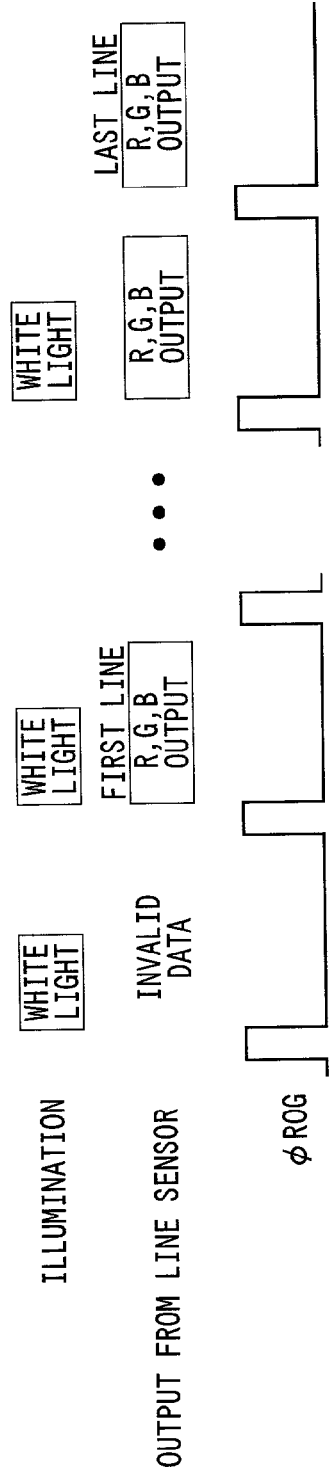

In other words, the operation of scanning a color image using the timing shown in FIG. 7 is different from the timing shown in FIG. 12(*b*). The R, G, B outputs are not performed while the white light is illuminated the output while the white light is illuminated can be handled as invalid data.

Therefore, in the fifth embodiment, even if a signal charge is generated by the charge-to-voltage converter 104 inside the line sensor 100, the film original 26 can be scanned without being influenced by this signal charge.

Moreover, in the fifth embodiment, as shown in FIG. 7, color images are scanned in the film scanner 10 having a color line sensor, although, as shown in FIG. 7 as well, scanning that includes turning off the white light while valid image data of the original is output can also be applied in an image scanning apparatus that scans monochrome images of originals for every line using a monochrome line sensor.

In the fourth and fifth embodiments described above, color images are scanned using the timings shown in FIG. 6 and FIG. 7 employing control (period of φROG and the timing to start the illumination of the illuminator 21) by the CPU 15. However, color images can also be scanned under the control of the host computer 60 using the timings shown in FIG. 6 and FIG. 7 by means of using a recording medium (such as a CDROM) whereon an image scanning program is stored that is equivalent to this type of control by the CPU 15 and installing this image scanning program on the host computer 60 in advance.

This type of image scanning program can also be downloaded as driver software or firmware by accessing to a specified home page through the Internet from the host computer 60.

For example, this type of download can be performed by either selecting a film scanner, which is one of many image scanning apparatuses, from a product list on a screen or selecting driver software or firmware compatible with the OS environment of the host computer 60 while accessing a specified home page from the host computer 60.

The following type of dialup connection can be used as a connection between the host computer 60 and the Internet. Basically, the host computer 60 is connected to a telephone line through a MODEM or a terminal adapter. Using this telephone line the host computer 60 is connected to a MODEM or a terminal adapter of a provider who is an Internet connection service company. The MODEM or terminal adapter of the provider is connected to a server. The server is connected 24 hours a day to the Internet via a router that functions to set the junction path. When required from the host computer 60, the telephone is dialed and a connection is established to the Internet (home page) via the server path of the provider. In addition, the connection system between the host computer 60 and the Internet is not limited to this type of dialup connection but can be any type of always-on connection with a provider using a dedicated line.

The invention is not limited to the above embodiments and various modifications may be made without departing from the spirit and scope of the invention. Any improvement may be made in part or all of the components.

What is claimed is:

1. An image scanning apparatus comprising:
   an illuminating device that irradiates illumination;
   an image sensor that outputs signal charges as image data of an original, including a light receiving part for receiving light, in which the light is an illumination irradiated from said illuminating device and influenced by the original, and includes a transferring unit for transferring signal charges generated at the light receiving part; and
   a controlling device that instructs said illuminating device to irradiate illumination, and directs a timing to transfer signal charges to said transferring unit under a predetermined condition, wherein:
   said illuminating device respectively irradiates upon the original as the illumination, light to be shut out other than at the light receiving part of said image sensor and light having a long wavelength not to be shut out other than at the light receiving part of the image sensor; and
   said controlling device prohibits the light having a long wavelength from being irradiated by said illuminating device during the period in which the image data of the original is being output through the transferring unit of said image sensor.

2. The image scanmng apparatus according to claim 1, wherein:
   said image sensor discharges signal charges not corresponding to the image data of the original as invalid data; and
   said controlling device permits the light having a long wavelength to be irradiated by said illuminating device during the period in which the invalid data is being discharged by said image sensor.

3. The image scanning apparatus according to claim 1, wherein:
the light having a long wavelength irradiated upon the original by said illuminating device is light that is received with low photosensitivity by a normal image on the original, and is shut out by a defect on the original; and
said controlling device detects a defect on the original based on image data of the original output from said image sensor, the image data obtained by said light having a long wavelength.

4. The image scanning apparatus according to claim 1, wherein:
said controlling device permits the light having a long wavelength to be irradiated by said illuminating device, prior to irradiation of the light to be shut out other than at the light receiving part of said image sensor, the light having a long wavelength irradiated during the period in which data not corresponding to image data of the original is being output through the transferring unit of said image sensor.

5. The image scanmng apparatus according to claim 4, wherein:
the light having a long wavelength irradiated upon the original by said illuminating device is light that is received with low photosensitivity by a normal image on the original, and is shut out by a defect on the original; and
said controlling device detects a defect on the original based on image data of the original output from said image sensor, the image data obtained by said light having a long wavelength.

6. An image scanning apparatus comprising:
an illuminating device for irradiating illumination on an original;
an imaging device for reading out signal charges from a light receiving part and outputting said signal charges as image data of the original, including said light receiving part for receiving light and for generating said signal charges, in which the light is an illumination irradiated from said illuminating device and influenced by the original; and
a controlling device for directing said illuminating device to irradiate illumination, directing said imaging device to read out the signal charges generated by said light receiving part, and prohibiting said illuminating device from irradiating any illumination onto the original during the time at which image data of the original is being output from said imaging device.

7. The image scanning apparatus according to claim 6, wherein:
said imaging device
has a line sensor comprising a plurality of the light receiving parts arranged in one dimension, a charge-to-voltage converter which converts the signal charges to voltages and outputs the voltages, a charge readout part which reads out the signal charges generated by said light receiving parts, and a charge transfer part which transfers the signal charges read out by said charge readout part to said charge-to-voltage converter, and
outputs image data of the original for every line while moving at least one of said line sensor and the original in a direction orthogonal to the direction said light receiving parts are arranged in; and
said controlling device directs said charge readout part to periodically read out one line of the signal charges generated by said light receiving parts and prohibits illumination from irradiating in said illuminating device while said signal charges are converted to the voltages by said charge-to-voltage converter and then output as image data of the original.

8. The image scanning apparatus according to claim 7, wherein:
said imaging device at least outputs signal charges generated by said charge-to-voltage converter as invalid data that does not correspond to image data of the original, while illumination is irradiating from said illuminating device.

9. A recording medium which stores an image scanning program which causes a computer to execute the step of:
controlling an image scanning apparatus having
an illuminating device for irradiating illumination on an original and
an imaging device for reading out signal charges from a light receiving part and outputting said signal charges as image data of the original, including said light receiving part for receiving light and for generating said signal charges, in which the light is an illumination irradiated from said illuminating device and influenced by the original; wherein said controlling step includes
a controlling procedure for directing said illuminating device to irradiate illumination, directing said imaging device to read out the signal charges generated by said light receiving part, and prohibiting said illuminating device from irradiating any illumination onto the original during the time at which image data of the original is being output from said imaging device.

10. The recording medium which stores an image scanning program according to claim 9, wherein:
said imaging device
has a line sensor comprising a plurality of the light receiving parts arranged in one dimension, a charge-to-voltage converter which converts the signal charges to voltages and outputs the voltages, a charge readout part which reads out the signal charges generated by said light receiving parts, and a charge transfer part which transfers the signal charges read out by said charge readout part to said charge-to-voltage converter, and
outputs image data of the original for every line while moving at least one of said line sensor and the original in a direction orthogonal to the direction said light receiving parts are arranged in; and
said controlling procedure directs said charge readout part to periodically read out one line of the signal charges generated by said light receiving parts and prohibits illumination from irradiating in said illuminating device while said signal charges are converted to the voltages by said charge-to-voltage converter and then output as image data of the original.

11. A data structure for coding and transmitting an image scanmng program which causes a computer to execute the step of:
controlling an image scanning apparatus comprising:
an illuminating device for irradiating illumination on an original; and
an imaging device for reading out signal charges from a light receiving part and outputting said signal charges as image data of the original, including said light receiving part for receiving light and for generating said signal charges, in which the light is an illumination irradiated from said illuminating device and influenced by the original; wherein the controlling step includes directing said illuminating device to irradiate illumination, directing said imaging device to read out the signal charges generated by said light receiving part, and prohibiting said illuminating device from irradiating any illumination onto the original during the time at which image data of the original is being output from said imaging device.

12. The data structure according to claim 11, wherein:

said imaging device has a line sensor comprising a plurality of the light receiving parts arranged in one dimension, a charge-to-voltage converter which converts the signal charges to voltages and outputs the voltages, a charge readout part which reads out the signal charges generated by said light receiving parts, and a charge transfer part which transfers the signal charges read out by said charge readout part to said charge-to-voltage converter, and outputs image data of the original for every line while moving at least one of said line sensor and the original in a direction orthogonal to the direction said light receiving parts are arranged in; and said controlling step directs said charge readout part to periodically read out one line of the signal charges generated by said light receiving parts and prohibits illumination from irradiating in said illuminating device while said signal charges are converted to the voltages by said charge-to-voltage converter and then output as image data of the original.

* * * * *